United States Patent Office
3,282,923
Patented Nov. 1, 1966

3,282,923
PROCESS FOR THE PREPARATION OF IMIDO-
CHLORIDES AND/OR HYDROCHLORIDES OF
IMIDOCHLORIDES
Johannes H. Ottenheym, Sittard, and Johan W. Garritsen, Geleen, Netherlands, assignors to Stamicarbon N.V., Heerlen, Netherlands
No Drawing. Filed Oct. 30, 1961, Ser. No. 148,730
Claims priority, application Netherlands, Oct. 31, 1960, 257,446, 257,447
11 Claims. (Cl. 260—239)

The invention relates to a process for the preparation of imidochlorides and/or hydrochlorides of imidochlorides with the exception of imidochloride compounds in which both the carbon atom and the nitrogen atom of the carbonimide groups is directly bound to an aryl or alkaryl group. The invention relates particularly to compounds satisfying one of the following general formulae and to hydrochlorides thereof:

(a)
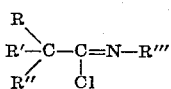

where R, R', R" and R'" represent identical or non-identical lower alkyl, hydrocarbon aryl, hydrocarbon aryl lower alkyl and lower alkyl-hydrocarbon aryl;

(b)
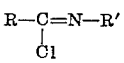

where R represents a cyclic lower alkyl, hydrocarbon aryl and lower alkyl-hydrocarbon aryl and R' lower alkyl and hydrocarbon aryl lower alkyl;

(c)
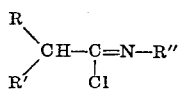

where R, R' and R" represent identical or non-identical lower alkyl, hydrocarbon aryl, hydrocarbon aryl lower alkyl and lower alkyl-hydrocarbon aryl;

(d)
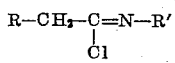

where R and R' represent identical or non-identical lower alkyl, hydrocarbon aryl, hydrocarbon aryl lower alkyl and lower alkyl-hydrocarbon aryl, and where R may also represent a hydrogen atom;

(e)
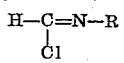

where R represents lower alkyl, hydrocarbon aryl, hydrocarbon aryl lower alkyl and lower alkyl-hydrocarbon aryl;

(f)
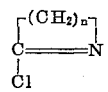

where $n$ has a value $>2$.

It is known that some of these imidochlorides can be prepared by reaction of corresponding N-mono-substituted acid amides with compounds containing phosphorus and chlorine, e.g. $PCl_5$, $PCl_3$, $POCl_3$ or mixtures of these compounds. This method of preparation has the drawback that by-products, in the form of compounds containing phosphorus, are formed which have to be removed from the reaction mixture and this involves an extra treatment in the purification of the desired final product. In addition, it has usually proved impossible, especially with the imidochlorides satisfying the abovementioned general Formulae d, e, and f, to isolate the imidochlorides and/or their hydrochlorides from the resulting reaction mixtures, since these substances are very liable to decompose.

Furthermore it has been proposed, especially for the preparation of the imidochlorides included under the abovementioned general Formulae b, d, e and f, to introduce phosgene into a solution of the corresponding N-mono-substituted acid amides. However, the yield of imidochlorides obtained by this process is low (e.g. the yield of 2-chloro-1,2-azacyclohepten from ε-caprolactam is 28%). In addition, neither with this process has it been proved that the corresponding imidochlorides and/or their hydrochlorides have actually been formed, as either the reaction products of the phosgenation reaction were immediately converted into more stable products or products were isolated that could not be conclusively identified as imidochlorides and/or their hydrochlorides.

It has now been found that imidochlorides, having the moiety

and/or hydrochlorides of imidochlorides, with the exception of the imidochlorides in which both the carbon and the nitrogen atom of the carbonimide group is directly bound to an aryl or alkaryl group, can be prepared in a simple way and with a high yield by reacting the corresponding N-mono-substituted acid amides having the moiety

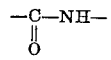

with phosgene in the presence of a solvent in such a way that at all times or at substantially all times during the course of the reaction at least one mole of phosgene is present per mole of acid amide, with the proviso that in the event that the acid amide is one in which at least one hydrogen atom is bound to the carbon atom adjacent to the carbon amide group or in which the carbon amide group is bound only to hydrogen atom, the said molar ratio does not exceed 2:1.

In general, by-products formed in this reaction are $CO_2$, which readily escapes from the reaction mixture, and HCl, which can escape or form a hydrochloride with the imidochloride formed. When a hydrochloride is formed, this can be separated off and used as such.

The process according to the invention is carried out in such a way that throughout the reaction at least one mole of phosgene is present per mole of acid amide, which in the case of those acid amides in which no hydrocarbon atom is bound to the carbon atom adjacent to the carbon amide group means either that the acid amide can be added gradually to a solution of the appropriate total amount of phosgene, or that both the reaction components can be fed simultaneously to the reaction zone in at least equimolar amounts.

With the other acid amides on the other hand the process has to be carried out in such a way that throughout the reaction at most two moles of phosgene are present per mole of acid amide, since reaction of these acid amides with larger amounts of phosgene yields N-substituted carbamyl chlorides. The latter reaction has already been described in the Belgian patent specification 582,478 filed in the name of the applicant for the preparation of 2 - chloro - azacyclo-2,3-alkene-1-carbochlorides starting from ω-lactams. In the case of the abovementioned acid amides therefore the process can be realized only by feeding the two components simultaneously to a reaction zone in such a ratio that at least one and at most two moles of phosgene will be present per mole of acid amide.

The preparation of imidochlorides from N-substituted acid amides tends to present the most difficulty with the imidochlorides covered by the aforesaid general Formulae $a$ and $b$ and those compounds of general Formula $c$ in which R" represents an aryl or alkaryl group.

It is therefore recommended in the preparation of these groups of imidochlorides to maintain at all times during the reaction a molar ratio of phosgene to the acid amide of at least 1.8:1. In the preparation of the other imidochlorides e.g. those of general Formulae *d, e* and *f* and the other compounds of Formula *c*, on the other hand the amount of phosgene present throughout the reaction should preferably be smaller, viz. 1–1.3 moles per mole of acid amide.

It is not necessary before the reaction to free the phosgene used from any small amounts of hydrogen chlorides which it may contain and it is even preferable not to do so, since it appears that the hydrogen chloride has a catalytic effect on the reaction.

The process according to the invention is carried out in the presence of a solvent for the phosgene, which solvent is inert to the reactants and reaction products under the reaction conditions and which is preferably also capable of dissolving the acid amide. Suitable solvents are, e.g. hydrocarbons, such as benzene and toluene, and in particular halogenated hydrocarbons, such as chloroform, carbon tetrachloride, chlorobenzene and dichlorobenzene.

It is recommended that the reaction be carried out at atmospheric pressure, so that it is possible to use simple apparatus. However, it may also be advantageous to use a slightly elevated pressure during the reaction, e.g. ¼, ½ or 1 at. gauge.

In the preparation of imidochlorides and hydrochlorides thereof covered by the aforesaid general Formulae *a* and *b* and those compounds of general Formula *c* in which R'' represents an aryl or alkaryl group, the reaction temperature may be chosen from within wide limits; it may be kept for instance between 0 and 100° C., although higher temperatures may also be used. Below 0° C. the reaction rate will become too low in most cases. As a rule it is recommendable during the first part of the reaction, when the reaction components are brought into contact with each other, to keep the temperature at a lower level, say at 20–40° C., and subsequently to raise it to, say, 40–100° C. for a secondary reaction period in which the highest possible degree of conversion is reached.

In the preparation of the other imidochlorides and hydrochlorides thereof, however, the reaction temperature is preferably kept below 40° C. to avoid side-reactions, but generally preferably not below 0° C. A preferable way of carrying out the process for preparing these imidochlorides and hydrochlorides thereof involves the reacting components, that is to say the acid amide, or a solution thereof, and a solution of phosgene being simultaneously and continuously introduced into a reaction zone in which the temperature is 20–40° C. and from which the reaction product is continuously discharged and immediately cooled to a temperature below 20° C.

In view of the high sensitivity of the imidochlorides, or the hydrchlorides thereof, to moisture it is recommended to exclude moisture as completely as possible during the whole preparation, and also to keep the products obtained without moisture.

The imidochlorides and/or hydrochlorides can be prepared according to the invention in a simpler way and, generally, with a higher yield than is possible by using the prior proposed techniques. The present invention makes it possible to isolate, either as such and/or in the form of their hydrochlorides, a number of imidochlorides the existence of which has up to now only been postulated but not yet proved, or which have not yet been postulated.

The imidochlorides and/or hydrochlorides of imidochlorides prepared according to the invention are valuable intermediate products, from which, by further conversions, important substances can be obtained. For instance, reaction with primary and secondary amines, yields amidines which are used in the preparation of dyestuffs and pharmaceuticals. By reaction with chlorine gas or another chlorinating agent and hydrolysis of the product formed thereby the imidochlorides satisfying the general Formula *d* or *f* aforesaid can be converted into $\alpha,\alpha$-dichloro-amides, or $\alpha,\alpha$-dichlorolactams, from which, by further reactions, amino-acids important for nutrition or high molecular weight products with plastic properties can be prepared.

The resulting imidochlorides and/or hydrochlorides may, if so desired, be purified by recrystallization or distillation, and, provided moisture is completely excluded, be kept in this condition for a considerable period of time, but in most cases such a purification can be omitted since the substances prepared by the process according to the invention can be converted to final useful products without any further treatment being required. With regard to the imidochlorides satisfying the abovementioned general Formula *c* when R'' therein represents an alkyl or aralkyl group, or *d, e* or *f*, it is even recommendable to subject these imidochlorides to further conversions without further purification where possible to restrict losses owing to intermediate decomposition. An excess of phosgene, if used, as well as the solvent employed can be recovered during processing of the reaction product and may be re-used.

It appears that acid amides of aromatic or alkylaromatic carboxylic acids, in which the nitrogen atom is also bound to an aryl or alkaryl group do not react with phosgene under the conditions of the process according to the invention. Accordingly, we make no claim to reactions in which acid amides of this category are used.

The invention will be further explained with reference to the following examples, which, however, are not meant to limit its scope in any way whatsoever.

Example 1

400 ml. of benzene are measured into a spherical 1 liter reaction vessel provided with a stirrer and a reflux cooler through which ice-water is pumped during the experiment, and 150 g. of phosgene are dissolved therein. A solution of 78.5 g. of N-butyl-pivalamide (N-butyl-trimethylacetamide) in 150 ml. of benzene is added to this solution in one hour, the temperature in the reaction vessel being kept at 30–40° C. Subsequently, the temperature of the reaction mixture is raised to 40–60° C. and kept at this level for 4 hours during which period a portion of the excess of phosgene distils over.

Upon completion of the reaction the remaining phosgene and the benzene are removed by distillation under normal pressure. The residue is fractionated at a pressure of 12 mm. Hg. At 65° C. the N-butyl-pivalimidochloride distils over as a colourless liquid with a refractive index $n_D^{20}=1.4440$ (54.5 g.). After that, an amount of 26.3 g. of unconverted N-butyl-pivalamide distils over at 120–122° C. The efficiency calculated to converted acid amide therefore amounts to 93.4%. The substance is identified by elementary analysis and infrared spectrometry.

Example 2

250 ml. of chloroform are measured into the reaction vessel used in Example 1 and 250 g. of phosgene are dissolved therein. In a period of 1 hour a solution of 163 g. N-propyl-benzamide in 250 ml. of chloroform are added to the above solution, the temperature in the reaction vessel being kept at 25–30° C. Subsequently, the temperature of the reaction mixture is gradually raised to 60° C. in 1.5 hr. and kept at this level for 4 hours. Upon completion of the reaction the remaining phosgene and the chloroform are removed by distillation under normal pressure and the residue is distilled off at a pressure of 2 mm. Hg. The resulting N-propyl-benzimidochloride distils over at 84° C. as a colourless liquid with a refractive index of $n_D^{20}=1.5421$. The yield amounts to 179 g., which corresponds to an efficiency of 98.6%. The substance is identified by elementary analysis and infrared spectrometry.

Example 3

In the same way as described in Example 2 a solution of 135 g. N-methyl-benzamide in 150 ml. of chloroform is added to a solution of 200 g. of phosgene in 400 ml. of chloroform at room temperature in a period of 1 hour. Subsequently, the temperature is gradually raised to 60° C. and kept at this level for another 5 hours. Upon removal of the remaining phosgene and chloroform by distillation at normal pressure the residue is distilled at a pressure of 1 mm. Hg. At 67° C. the N-methyl benzimidochloride distils over as a colourless liquid with a refractive index of $n_D^{20}=1.5625$. The yield is 149 g., i.e. the efficiency amounts to 97.1%. The substance is identified by elementary analysis and infrared spectrometry.

Example 4

A solution of 100 g. of phosgene in 200 ml. of chloroform and a solution of 81.5 g. of N-phenyl-isobutyramide in 200 ml. of chloroform are introduced simultaneously into the reaction vessel mentioned in Example 1 in a period of 1 hour, the temperature in the reaction vessel being kept at 25-30° C. Subsequently, the temperature of the reaction mixture is gradually raised to 60° C. in 2½ hours and kept at this level for 3 hours.

After completion of the reaction the remaining phosgene and the chloroform are removed by distillation at normal pressure and the residue is distilled at a pressure of 3 mm. Hg. At 76° C. the resulting N-phenyl-isobutyrimidochloride distils over as a colourless liquid with a refractive index of $n_D^{20}=1.5380$ at 76° C. The yield amounts to 70.5 g., which corresponds to an efficiency of 77.7%. The substance is identified by means of elementary analysis and infrared spectrometry.

Example 5

In the same way as described in Example 4 a solution of 100 g. of phosgene in 250 g. of chloroform and a suspension of 101.5 g. of N-phenylhexahydrobenzamide in 250 ml. of chloroform are introduced into the reaction vessel in one hour, the temperature in the reaction vessel being kept at 35° C. Subsequently, the temperature is gradually raised to 55-60° C. in two hours, and kept at this level for 3 hours.

After the excess of phosgene and the chloroform have been distilled off at normal pressure, the residue is distilled at a pressure of 1 mm. Hg. At 122-123° C. the resulting N-phenyl-hexahydrobenzimidochloride distils over as a colourless liquid ($n_D^{20}=1.5528$). The yield is 90 g., which is equivalent to an efficiency of 81.3%. The substance is identified by elementary analysis and infrared spectrometry.

Example 6

Into the same reaction vessel as used in the previous examples, a solution of 55 g. of phosgene in 300 ml. of dry ether and a solution of 64.5 g. of N-butyl-propionamide are introduced in a period of 1 hour at a temperature of about 20° C. Subsequently, the reaction is allowed to continue for 5 hours, after which the remaining phosgene and the ether are expelled from the reaction vessel by means of dry nitrogen, and the last traces are removed by means of a high-vacuum pump.

There remains 73.5 g. of light-yellow liquid (i.e., the theoretical yield) which is identified as N-butyl-propionimido-chloride by means of a chlorine determination and infrared spectrometry.

Example 7

Into the same reaction vessel as used in the previous examples, a solution of 55 g. of phosgene in 300 ml. of carbon tetrachloride and a solution of 57.5 g. of N-propyl-propionamide in 150 ml. of carbon tetrachloride are introduced in a period of 1 hour at a temperature of about 20° C., after which the reaction is allowed to continue for 5 hours at room temperature. The remaining phosgene and the carbon tetrachloride are subsequently expelled by means of dry nitrogen and the last traces are removed by means of a high-vacuum pump.

The weight of the light-yellow liquid left amounts to 68.5 g., which is slightly more than the theoretical yield. This is due to a small amount of carbon tetrachloride, which is not completely removed in high vacuo either. Identification by means of infrared spectrometry shows that the substance is N-propyl-propionimidochloride.

Example 8

In the same way as described in the previous examples, solutions of 100 g. of phosgene in 250 ml. of chloroform and 67.5 g. of acetanilide in 250 ml. of chloroform are introduced into the reaction vessel in one hour at a temperature of about 20° C. After half an hour already a solid crystalline substance forms in the reaction mixture with evolution of heat. After the reaction has been allowed to continue for 3 hours at 25-30° C., this solid substance is filtered off and dried under dry nitrogen. The weight of this substance is 51.5 g. and the melting point 119-121° C. If this substance is mixed with the hydrochloride of acetanilide, no depression is observed in the determination of the melting point and the identity of the two substances also appears from infrared spectrometry. The amount of isolated salt corresponds to 60% of the starting product.

Upon evaporation in vacuo at 20-30° C. the mother liquor of the filtered product yields a residue of 30 g. of a light-yellow liquid which is very hygroscopic and unstable. By means of infrared spectrometry this substance is identified as almost pure N-phenyl-acetimidochloride. The yield calculated to acetanilide is consequently about 39%.

Example 9

A solution of 59 g. of N-methyl formamide in 200 ml. of benzene and a solution of 200 g. of phosgene in 300 ml. of benzene are introduced in a period of 1 hour into the same reaction vessel as used in the preceding examples. The reaction mixture is subsequently raised to a temperautre of about 40° C. and kept at this temperature for 5 hours.

After completion of the reaction the remaining phosgene is expelled by means of dry nitrogen and the resulting precipitate is filtered off and dried under nitrogen. 70 g. of white crystalline product with a melting point of 160-162° C. is obtained which, by means of a chlorine determination and infrared spectrometry, is identified as the hydrochloride of N-methyl formimidochloride. Consequently the yield calculated to N-methyl formamide is 61.4%.

Example 10

A solution of 56 g. of phosgene in 400 ml. of carbon tetrachloride and a solution of 56.5 g. of ε-caprolactam in 150 ml. of carbon tetrachloride are introduced in one hour at a temperature of about 20° C. into the same reaction vessel as used in the preceding examples, after which the reaction is allowed to continue for 6 hours at this temperature.

After completion of the reaction the precipitate formed is filtered off and dried in an atmosphere of dry nitrogen. 76 g. of white crystalline product with a melting point of 66-70° C. (determined in a closed tube) is obtained. By means of chlorine determination and infrared spectrometry the substance is identified as the hydrochloride of 2-chloro-1,2-azacycloheptene (caprolactimidochloride). Consequently, the yield is 90.5%, while an amount of the salt remains dissolved in the mother liquor.

Example 11

A cylindrical reaction vessel of 50 ml. capacity is provided with a stirrer, a reflux cooler through which ice-water is pumped during the experiment, two feed openings in the top and one discharge opening in the bottom.

ml. of chloroform is fed into this vessel and subsequently a solution of 57.5 g. of N-propyl-propionamide in 150 ml. of chloroform and a solution of 50 g. of phosgene in 150 ml. of chloroform are simultaneously added in one hour, the reaction mixture being continously drained from the bottom of the vessel so that the vessel always remains half-full. The temperature in the reaction vessel is kept at 20–25° C. and the reaction mixture is discharged into a collector which is kept at about 18° C. and is provided with a vent hole on which a tube with a drying agent is placed.

Upon completion of the reaction the resulting N-propyl-propionimidochloride is converted into the corresponding amidine by introducing the whole contents of the collector in one hour into a stirred solution of 140 g. of aniline in 250 ml. of chloroform. The temperature is then kept at about 30° C. and after addition of the imidochloride, the reaction is allowed to continue for about half an hour at about 40° C. The reaction mixture is then separated into two layers, the aqueous layer is made alkaline with sodium hydroxide solution and subsequently extracted with benzene. From the resulting benzene solution the solvent is distilled off at normal pressure and the residue is distilled at a pressure of 1 mm. Hg. Following the first runnings of aniline the N-propyl-N'-phenyl-propionamidine distils over at 122° C. as a colourless oil ($n_D^{20}=1.5510$). The yield amounts to 77 g., which corresponds to an efficiency of 81.0% calculated to the N-propyl-propionamide. The yield of imidochloride is consequently at least 81%. The amidine is characterized by means of elementary analysis and infrared spectrometry.

*Example 12*

In the same reaction vessel and in the same way as described in Example 11 as solution of 56.5 g. of ε-caprolactam in 150 ml. of chloroform is reacted for one hour with a solution of 50 g. of phosgene in 150 ml. of chloroform at a temperature of 20–25° C. The reaction mixture is drained off into a collector which is kept at about 18° C.

After completion of the reaction the resulting 2-chloro-1,2-azacycloheptene is converted into the corresponding amidine by allowing the whole contents of the collector, in the same way as described in Example 11, to react with 140 g. of aniline in 250 ml. of chloroform and processing the reaction mixture in the same way. At a pressure of 1–2 mm. Hg and at 126–128° C., the 2-anilido-1,2-azacycloheptene distils over as a colourless oil which solidifies to yield a substance with a melting point of 102° C. Recrystallization from cyclohexane gives a white crystalline substance with a melting point of 105° C., which is further characterized by means of elementary analysis. The yield amounts to 81 g., which corresponds to an efficiency of 86.2% calculated to ε-caprolactam. The yield of imidochloride is consequently at least 86.2%.

*Example 13*

In the same way as described in Example 12 a solution of 2 chloro-1,2-azacycloheptene in chloroform is prepared from 113 g. of ε-caprolactam in 250 ml. of chloroform and 100 g. of phosgene in 250 ml. of chloroform. Chlorine gas is subsequently passed into this solution at a rate allowing it to be completely absorbed. The temperature of the solution is kept below 30° C. When chlorine is no longer absorbed (after about half an hour), the reaction mixture is kept at 25° C. for one more hour after which the chloroform is distilled off at reduced pressure and at a temperature below 40° C. The liquid residue is poured onto ice and after 1 hour's stirring the water is decanted and the remaining crystal mass is filtered off, washed with cold ether, and dried. 128 g. of α,α-dichlorocaprolactam with a melting point of 122–123° C. are obtained. The efficiency calculated to ε-caprolactam is 70.3%.

In a similar experiment the chlorination is carried out by adding the solution of the imidochloride in 2 hours to 1 litre of sulphuryl chloride at 25–30° C., then gradually raising the temperature of the reaction mixture to 60° C. in 2 hours, and keeping the reaction mixture at this temperature for one more hour. After distilling off at reduced pressure the chloroform and the excess of sulphuryl chloride, pouring onto ice, decanting, filtering off, washing, and drying, 160 g. of α,α-dichloro-caprolactam with a melting point of 121–122° C. are obtained. Efficiency: 88.0%.

We claim:

1. A process for the preparation of a member of the group consisting of imidochlorides having one of the following formulae:

(a)
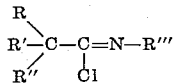

wherein R, R', R" and R'" are substituents selected from the group consisting of lower alkyl, hydrocarbon aryl, hydrocarbon aryl lower alkyl and lower alkyl-hydrocarbon aryl;

(b)
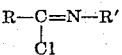

wherein R is selected from the group consisting of cyclic lower alkyl, hydrocarbon aryl and lower alkyl-hydrocarbon aryl and R' is selected from the group consisting of lower alkyl and hydrocarbon aryl-lower alkyl;

(c)
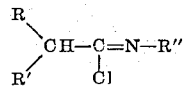

wherein R, R' and R" are selected from the group consisting of lower alkyl, hydrocarbon aryl, hydrocarbon aryl lower alkyl and lower alkyl-hydrocarbon aryl;

(d)
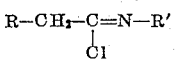

wherein R is selected from the group consisting of hydrogen, lower alkyl, hydrocarbon aryl, hydrocarbon aryl lower alkyl and lower alkyl-hydrocarbon aryl, and R' is selected from the group consisting of lower alkyl, hydrocarbon aryl, hydrocarbon aryl lower alkyl and lower alkyl-hydrocarbon aryl;

(e)
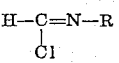

wherein R is selected from the group consisting of lower alkyl, hydrocarbon aryl, hydrocarbon aryl lower alkyl and lower alkyl-hydrocarbon aryl; and (f)
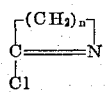

wherein $n$ has a value $>2$, and the hydrochlorides of said imidochlorides, said process comprising the steps of reacting the corresponding N-monosubstituted acid amide with phosgene in the presence of an inert organic solvent and maintaining throughout said reaction at least one mole of phosgene per mole of acid amide with the proviso that the molar ratio of phosgene to acid amide is between 1:1 and 2:1 when preparing the compounds represented by Formulae c–f, and then recovering the respective imidochloride.

2. Process according to claim 1 wherein the acid amide is one which is free of hydrogen bound to the carbon atom adjacent to the carbonamide group and at least 1.8 moles of phosgene are present throughout the reaction.

3. Process according to claim 1 wherein the acid amide is one which has one hydrogen atom bound to the carbon atom adjacent to the carbonamide group and 1.8–2.0 moles of phosgene are present per mole of acid amide.

4. Process according to claim 1 wherein the acid amide corresponds with one of the compounds defined by Formulae *d*, *e* and *f* and from 1.0 to 1.3 moles of phosgene are present throughout the reaction per mole of acid amide.

5. Process for the preparation of 2-chloro-1,2-azacycloheptene which comprises gradually adding ε-caprolactam to a solution of phosgene in an organic solvent selected from the group consisting of chloroform, carbon tetrachloride, benzene, chlorobenzene, dichlorobenzene and toluene, the molar ratio of phosgene to ε-caprolactam being kept within the range of 1.0:1 to 1.3:1, at substantially all times during the course of the reaction.

6. Process according to claim 1, characterized in that the solvent used is capable of dissolving both the phosgene and the acid amide under the reaction conditions.

7. Process according to claim 1, characterized in that the reaction is carried out at atmospheric pressure.

8. Process according to claim 1, characterized in that during the reaction of the acid amide the temperature of the reaction mixture is kept at a value between 0 and 100° C.

9. Process according to claim 8, characterized in that during the first part of the reaction period the temperature of the reaction mixture is kept between 20 and 40° C. and during the remainder of the said period between 40 and 100° C.

10. Process according to claim 4, characterized in that during the reaction of the acid amide the temperature of the reaction mixture is kept at a value between 0 and 40° C.

11. Process according to claim 10, characterized in that the reaction components are simultaneously and continuously introduced into a reaction zone, in which the temperature is kept between 20 and 40° C. and from which the reaction product is continuously discharged and immediately cooled to a temperature below 20° C.

References Cited by the Examiner

UNITED STATES PATENTS 2,836,592  5/1958  Anagnostopoulos et al. _ 260—239

OTHER REFERENCES

Australian Abstract: 52,807/59, Mar. 17, 1960.

ALEX MAZEL, *Primary Examiner.*

IRVING MARCUS, NICHOLAS S. RIZZO, WALTER A. MODANCE, *Examiners.*

J. T. MILLER, A. D. ROLLINS, *Assistant Examiners.*